United States Patent
Matsuda et al.

(10) Patent No.: US 7,267,102 B2
(45) Date of Patent: Sep. 11, 2007

(54) ENGINE CONTROL DEVICE AND ENGINE CONTROL METHOD FOR STRADDLE TYPE VEHICLE

(75) Inventors: Takeshi Matsuda, Shizuoka (JP); Tadayuki Yuuki, Shizuoka (JP); Kousuke Urushihara, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/406,523

(22) Filed: Apr. 18, 2006

(65) Prior Publication Data
US 2006/0247840 A1   Nov. 2, 2006

(30) Foreign Application Priority Data
May 2, 2005 (JP) ............................... 2005-133784

(51) Int. Cl.
*F02D 11/10* (2006.01)
(52) U.S. Cl. ..................................... 123/399
(58) Field of Classification Search ................ 123/399
See application file for complete search history.

(56) References Cited

U.S. PATENT DOCUMENTS

| | | | |
|---|---|---|---|
| 4,919,096 A | 4/1990 | Manaka et al. | |
| 5,899,830 A * | 5/1999 | Tabata | 477/111 |
| 5,983,861 A | 11/1999 | Nishio et al. | |
| 6,220,226 B1 * | 4/2001 | Alm et al. | 123/492 |
| 6,223,721 B1 * | 5/2001 | Bauer et al. | 123/399 |
| 6,318,163 B1 | 11/2001 | Kraemer | |
| 6,652,417 B2 * | 11/2003 | Iriyama | 477/111 |
| 6,692,403 B2 * | 2/2004 | Charaudeau et al. | 477/3 |

FOREIGN PATENT DOCUMENTS

| | | |
|---|---|---|
| DE | 4403351 A1 | 8/1994 |
| EP | 06 00 9074 | 8/2006 |
| GB | 2 329 728 A | 3/1999 |
| JP | 61-106934 | 5/1986 |
| JP | 248487 * | 9/2001 |

\* cited by examiner

*Primary Examiner*—Hai Huynh
(74) *Attorney, Agent, or Firm*—Hogan & Hartson LLP (57) ABSTRACT

An engine control device responsive to a rider's accelerator operation. Throttle opening is controlled such that engine torque increases in response to an increase in accelerator displacement for all engine speeds. At least when the engine speed is in a low-speed range, the engine torque approximates a maximum torque value in the range in which the accelerator displacement is small, and thereafter the engine torque is controlled to gradually increase to the maximum toque value in response to an increase in the accelerator displacement. The accelerator displacement and the throttle opening that is set correspondingly to the accelerator displacement are stored in a storage means in advance as map data relative to each engine speed.

8 Claims, 10 Drawing Sheets

ENGINE CONTROL DEVICE AND ENGINE CONTROL METHOD FOR STRADDLE TYPE VEHICLE

BACKGROUND OF THE INVENTION

1. Field of the Invention

The present invention relates to an engine control device and an engine control method for a straddle type vehicle, and more specifically to an engine control device and an engine control method that are responsive to a rider's accelerator operation.

2. Description of Related Art

Figure 7:
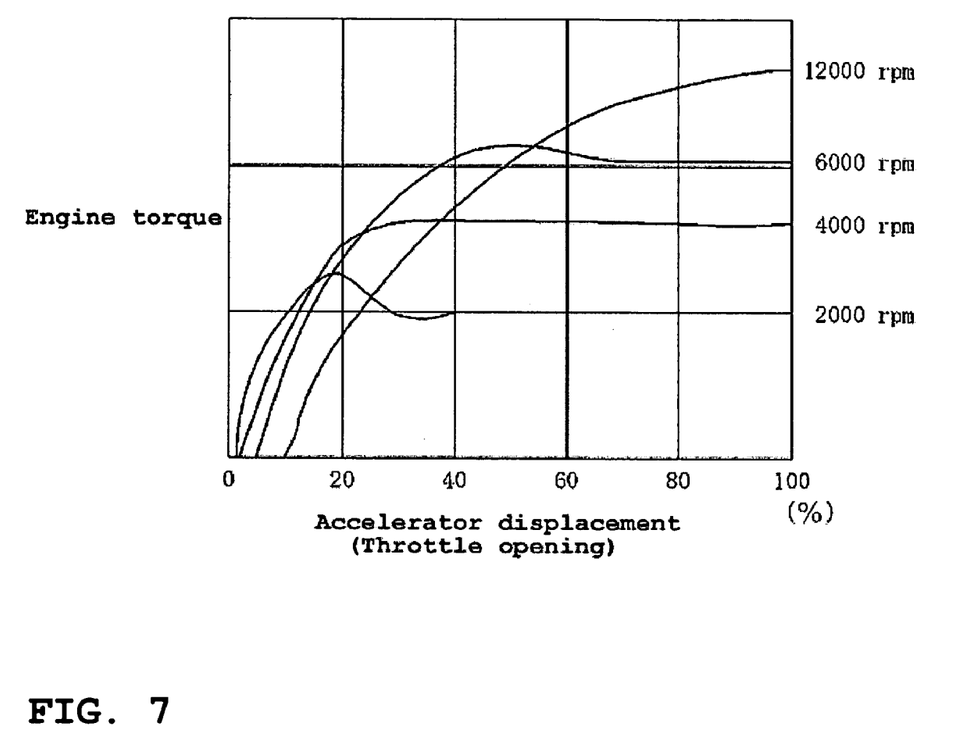
FIG. 7 is a graph showing the engine torque characteristics relative to the accelerator displacement in the conventional art.

The amount of intake air to a two-wheeled motor vehicle engine is controlled by adjusting the opening of a throttle valve in response to the displacement of an accelerator grip operated by the rider. In the case in which the accelerator lever and the throttle valve are mechanically linked to each other by a linkage, the relation between the opening of the accelerator lever (accelerator displacement) and the opening of the throttle valve (throttle opening) is linear. However, the relation between the throttle opening and engine torque is not linear. Engine torque characteristics relative to the throttle opening, or accelerator displacement, vary depending on engine speed, which are generally shown in FIG. 7.

More specifically, when the engine speed is low, a maximum peak value of the engine torque is generated in the range in which the accelerator displacement (throttle opening) is small. As the engine speed increases, the accelerator displacement for the maximum peak value becomes larger. It should be noted that linearity of the engine torque relative to the accelerator displacement decreases for lower engine speed. As the accelerator displacement for the maximum peak value is further increased, the range in which the engine torque decreases or the range in which the engine torque does not change can be distinct, which is called an over venturi effect.

To avoid the over venturi effect, there is a method in which a sub throttle valve is provided upstream from the throttle valve to adjust the opening of the sub throttle valve. In this method, when the throttle valve is excessively opened, the sub throttle valve is controlled in the closing direction so that the flow of air passing through an intake passage accelerates and intake efficiency increases. The over venturi effect is thereby avoided. However, this method requires the sub throttle valve, resulting in an increase in size of a throttle body and manufacturing cost.

Figure 6:
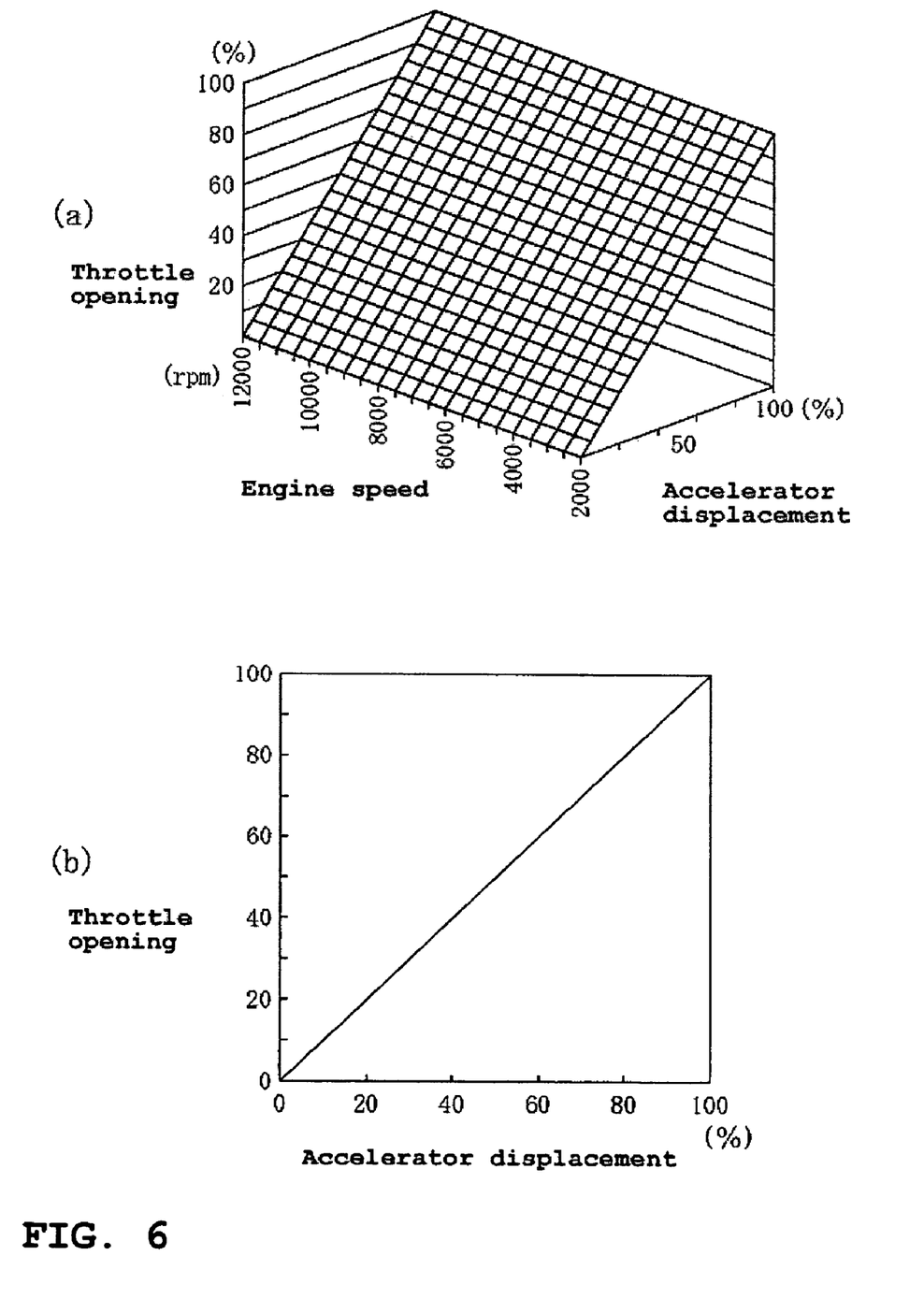
FIGS. 6(a) and 6(b) are graphs showing the relation between the accelerator displacement and the throttle opening in the case in which an accelerator lever and a throttle valve are mechanically linked to each other in the conventional art.
Figure 8:
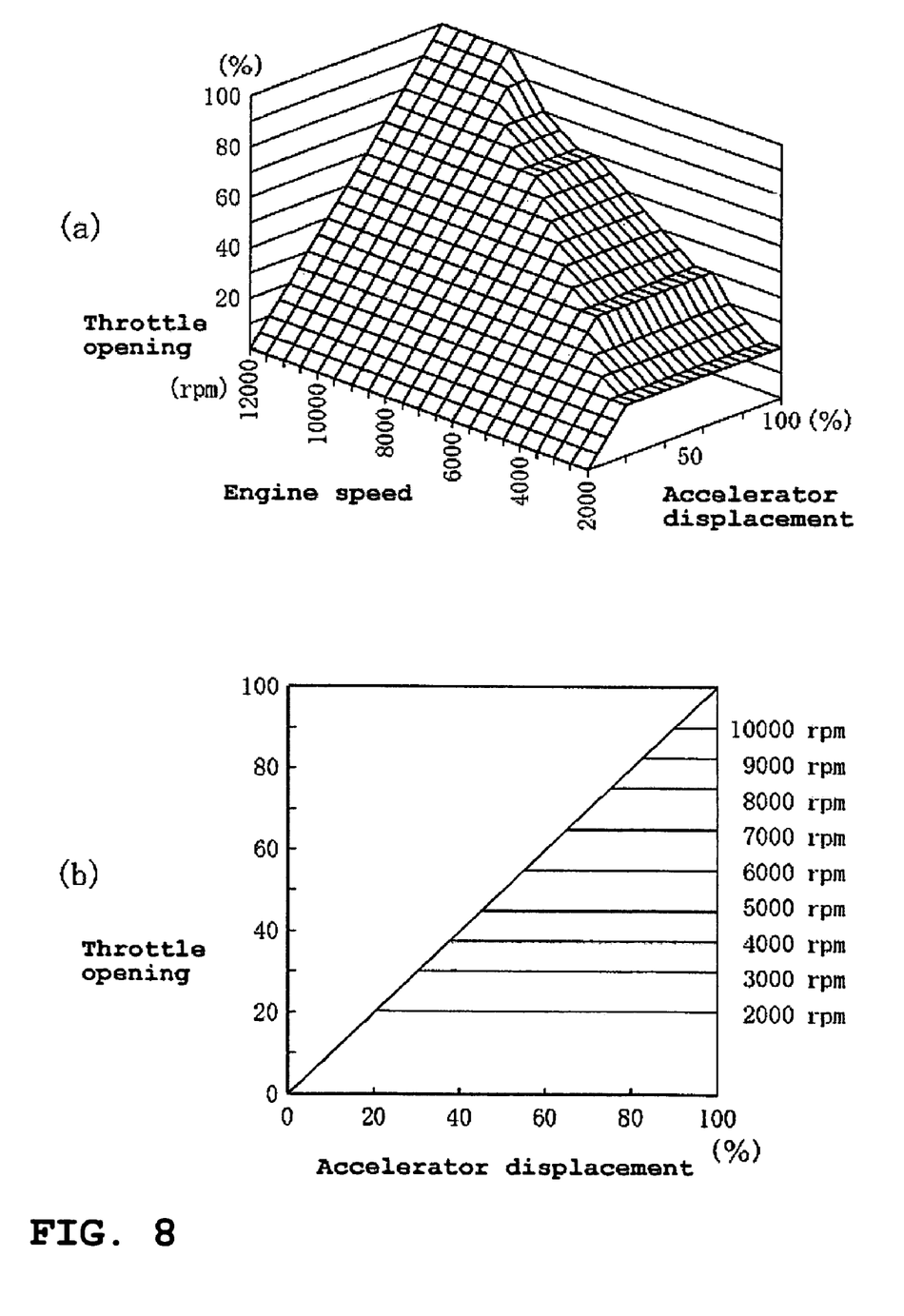
FIGS. 8(a) and 8(b) are graphs showing the relation between the accelerator displacement and the throttle opening in the case in which an over venturi effect in the conventional art is avoided.
Figure 9:
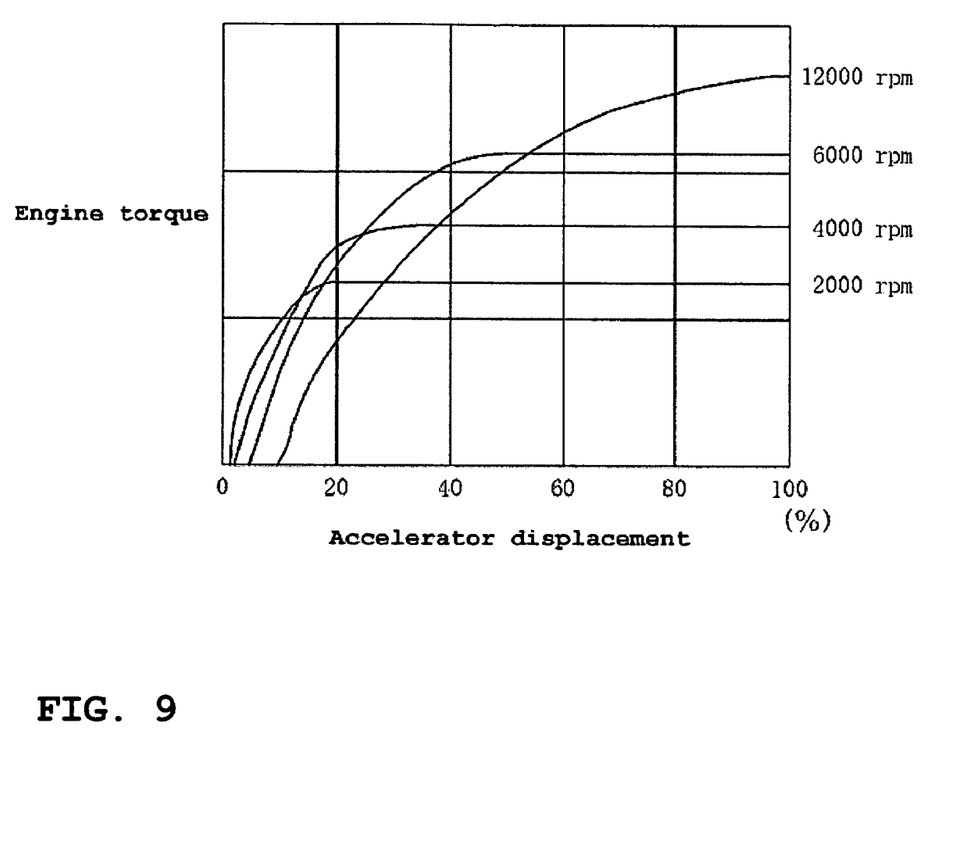
FIG. 9 is a graph showing the engine torque characteristics relative to the accelerator displacement in the case in which the over venturi effect in the conventional art is avoided.

Such a method as shown in FIGS. 8(a) and 8(b) is, therefore, known to avoid the over venturi effect not by using the sub throttle valve but by merely adjusting the opening of the throttle valve. FIGS. 8(a) and 8(b) are graphs showing the relation between the accelerator displacement and the throttle opening, which correspond to FIGS. 6(a) and 6(b). This method is designed such that the throttle valve is not opened larger than a throttle opening at which the maximum peak value of the engine torque is generated, as shown in FIGS. 8(a) and 8(b). As a result, any decrease in engine torque due to the over venturi effect is avoided for all engine speeds, as shown in FIG. 9.

However, according to this method, the engine torque is constant in the range in which the accelerator displacement is large, and therefore the engine torque does not increase for any increase in accelerator displacement. Thus, no torque control can be executed in such range. The rider, therefore, cannot obtain a feeling of oneness with the vehicle, resulting in poor riding comfort.

Figure 10:
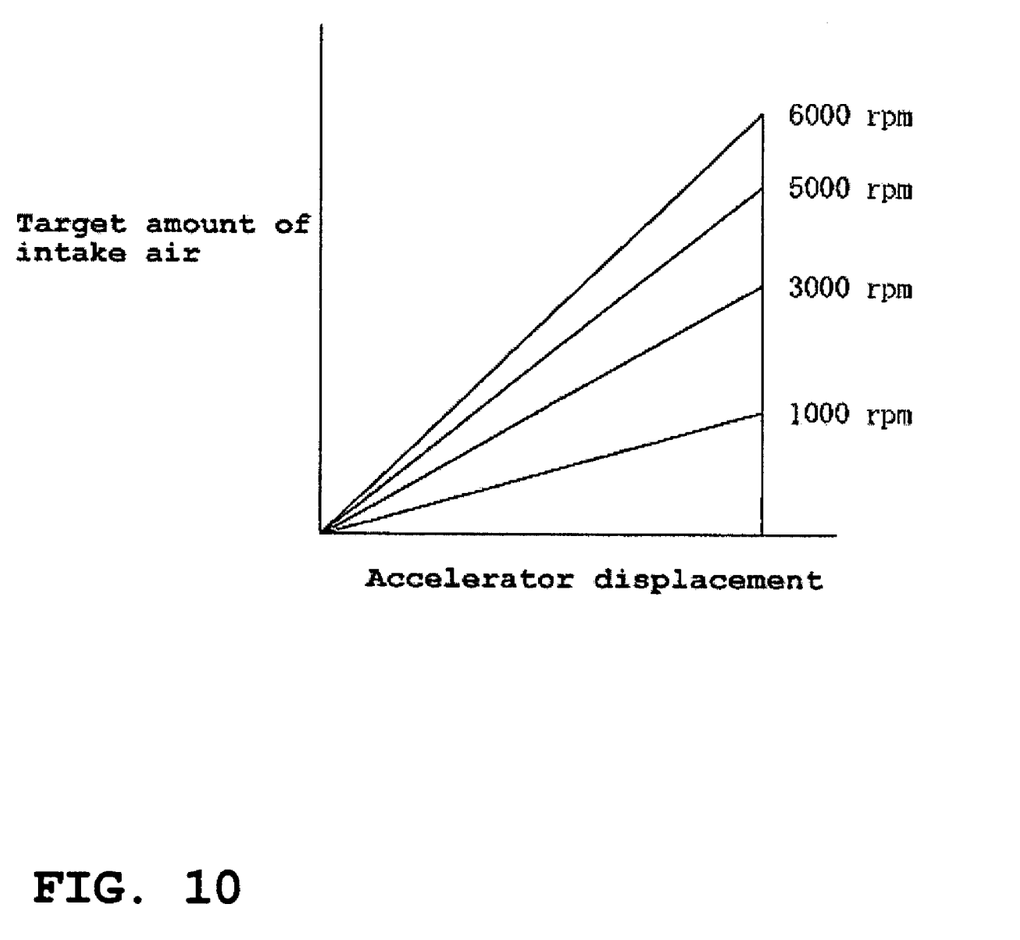
FIG. 10 is a graph showing the target amount of intake air relative to the accelerator displacement in the conventional art.

To solve the foregoing problems, Japanese Patent Document JP-A-Sho 61-106934 discloses a method in which engine output is increased for an increase in accelerator displacement for the overall range of rider's accelerator operation. As shown in FIG. 10, this method is designed such that target amount-of-intake-air characteristics relative to the accelerator displacement for each engine speed are continuously increased in response to an increase in the accelerator displacement. When the accelerator is fully operated (i.e., at a maximum opening of the accelerator lever), a maximum amount of intake air is obtained. Engine output thereby can be smoothly increased in response to an increase in the accelerator displacement independently of the engine speed, so that a satisfactory acceleration feeling is obtained. The throttle valve is driven and controlled to an opening at which the target amount of intake air shown in FIG. 10 is provided.

According to the method disclosed in JP-A-Sho 61-106934, the engine output can be increased linearly in response to the rider's accelerator operation for the overall range of the accelerator displacement. However, the target amount of intake air is gradually increased in proportion to the accelerator opening, based on the maximum amount of intake air when the accelerator is fully operated. This raises a problem of a poor response of the engine output when the accelerator displacement is small (when the accelerator lever is started to be opened).

SUMMARY OF THE INVENTION

The present invention has been made in view of the foregoing problems, and a main object of the present invention is to provide an engine control device responsive to rider's accelerator operation.

The present invention is directed to an engine control device for a straddle type vehicle with an electronically controlled throttle valve in which a throttle opening is controlled in response to the displacement of an accelerator, in which the throttle opening is controlled such that engine torque increases in response to an increase in the accelerator displacement for all engine speeds, and in which at least when the engine speed is in a low-speed range, the engine torque approximates a maximum torque value in the range in which the accelerator displacement is small. Thereafter, the engine torque is controlled to gradually increase to the maximum toque value in response to an increase in the accelerator displacement.

In a preferred embodiment, the accelerator displacement and the throttle opening, that is set correspondingly to the accelerator displacement, are stored in a storage means in advance as map data relative to each engine speed.

In a preferred embodiment, the engine control device includes an accelerator displacement detection means for detecting the accelerator displacement, and an engine speed detection means for detecting the engine speed. The rotation of the electronically controlled throttle valve is controlled to the throttle opening that is determined based on the map data stored in the storage means relative to the accelerator displacement detected by the accelerator displacement detection means and the engine speed detected by the engine speed detection means.

The present invention is further directed to an engine control method for a straddle type vehicle. Engine torque is controlled by electronically controlling throttle opening in response to the displacement of an accelerator. The throttle opening is controlled such that the engine torque increases in response to an increase in the accelerator displacement for all engine speeds.

In a preferred embodiment, the throttle opening is controlled such that at least when the engine speed is in a low-speed range, the engine torque approximates a maximum torque value in the range in which the accelerator displacement is small. Thereafter, the engine torque is controlled to gradually increase to the maximum toque value in response to an increase in the accelerator displacement.

In a preferred embodiment, the accelerator displacement and the throttle opening, that is set correspondingly to the accelerator displacement, are stored in advance as map data relative to each engine speed, and the throttle opening is determined based on the stored map data relative to the detected accelerator displacement and engine speed.

A straddle type vehicle according to the present invention is a straddle type vehicle with the above engine control device.

In the engine control device for a straddle type vehicle of the present invention, engine torque is controlled to increase in response to an increase in the displacement of an accelerator. Further, at least when engine speed is in a low-speed range, the engine torque approximates a maximum torque value in the range in which the accelerator displacement is small, and thereafter the engine torque is controlled to gradually increase to the maximum torque value in response to an increase in the accelerator displacement. The rider, therefore, can invariably feel torque control at the time of his/her accelerator operation. Further, even in the range in which the accelerator displacement is small, the rider can obtain a great acceleration feeling, and engine control responsive to rider's accelerator operation is achieved.

DETAILED DESCRIPTION OF THE INVENTION

An embodiment of the present invention will be described below with reference to the drawings. In the drawings below, for the sake of simplifying explanation, components having substantially the same function are indicated with the same reference symbol. Further, the present invention is not limited to the following embodiment.

Figure 1:
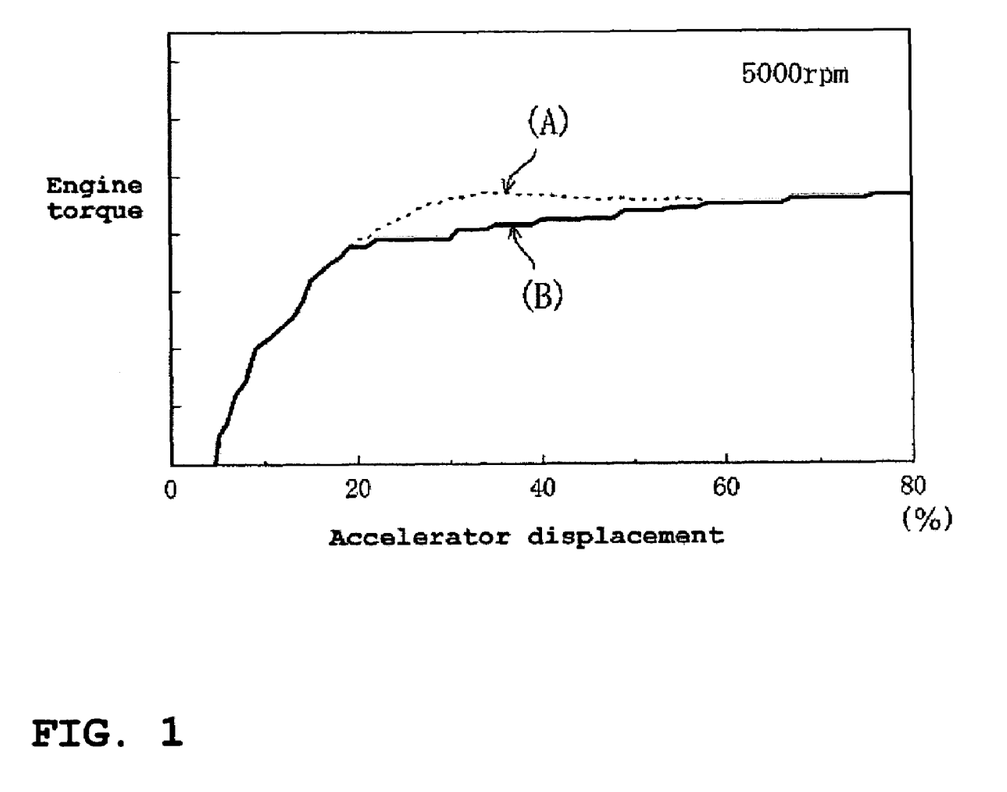
FIG. 1 is a graph illustrating engine output control for a two-wheeled motor vehicle according to the present invention.

FIG. 1 is a graph illustrating engine control for a two-wheeled motor vehicle according to the present invention. The horizontal axis represents the displacement of an accelerator, and the vertical axis represents engine torque. A graph shown by a broken line (A) in FIG. 1 shows engine torque characteristics in the case in which an over venturi effect is eliminated as illustrated in FIG. 9 (at an engine speed of 5000 rpm). In this case, the engine torque is constant in the range in which the accelerator displacement is large, as described above.

On the other hand, a graph shown by a solid line (B) in FIG. 1 shows engine torque characteristics according to the present invention. In the range of the accelerator displacement in which the engine torque is constant, the engine torque is controlled to gradually increase to a maximum torque value in response to an increase in the accelerator displacement. More specifically, the engine torque characteristics according to the present invention promptly approximates the maximum torque value in the range in which the accelerator displacement is small, and thereafter the engine torque characteristics are controlled to gradually increase to the maximum torque value in response to an increase in the accelerator displacement.

In such manner, in the range in which the accelerator displacement is small, the engine torque promptly approximates a maximum torque value. Thus, the rider can obtain a great acceleration feeling. Thereafter, the engine torque gradually increases to the maximum torque value in response to an increase in the accelerator displacement, which enables the rider to control engine torque through his/her accelerator operation.

As seen from the graph of FIG. 1, in the torque characteristics shown by the solid line (B), a slight torque loss occurs relative to the torque characteristics shown by the broken line (A). However, the torque characteristics shown by the solid line (B) enables responsive engine control for the overall range of rider's accelerator operation, thereby providing better riding comfort for the rider.

Figure 2:
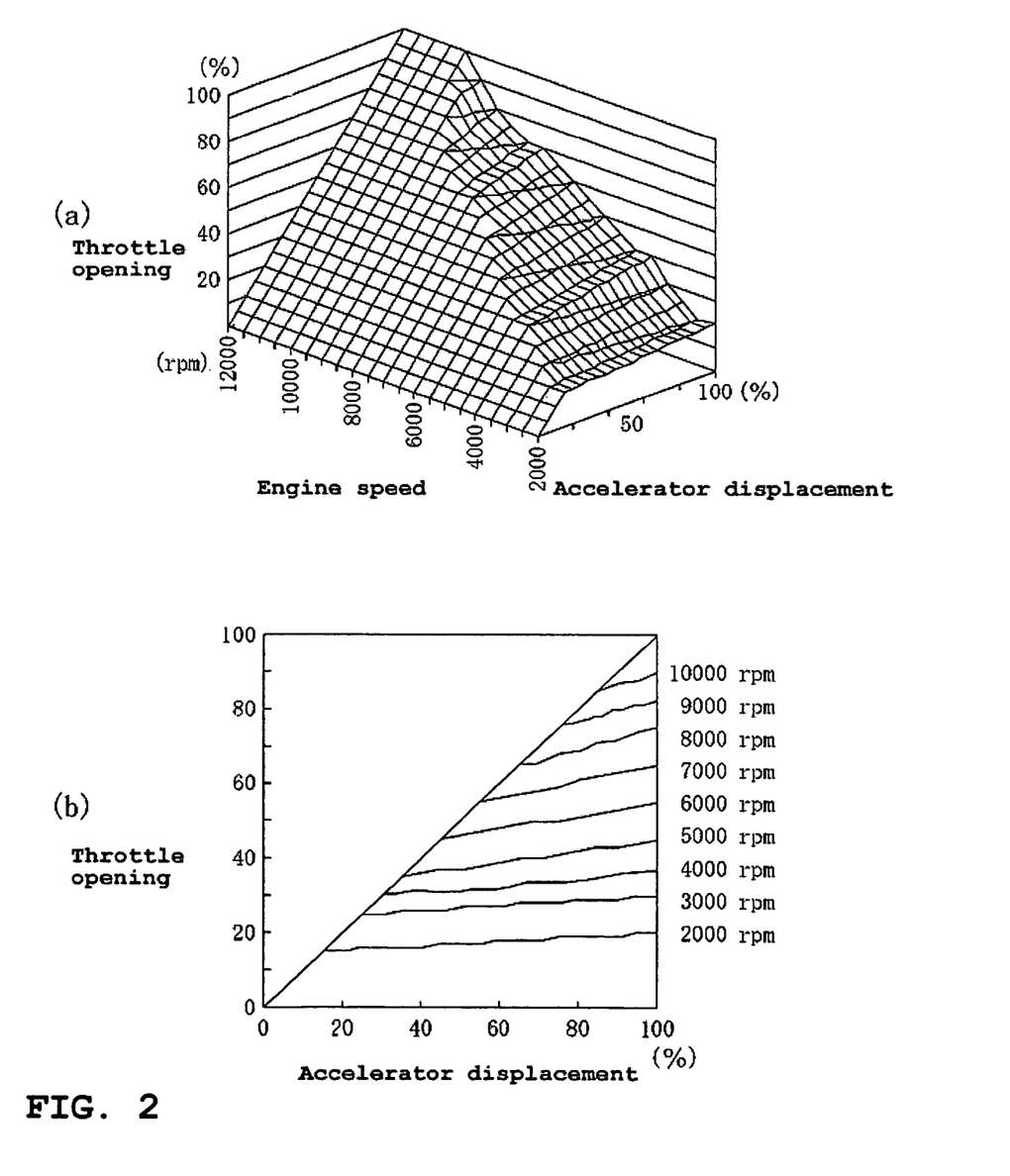
FIGS. 2(a) and 2(b) are graphs of throttle opening required to obtain torque characteristics relative to accelerator displacement according to the present invention.

FIGS. 2(a) and 2(b) are graphs of throttle opening required to obtain the torque characteristics shown by the solid line (B) in FIG. 1 relative to the accelerator displacement for each engine speed. Those values are stored as throttle opening vs. accelerator displacement map data in storage means (e.g., a ROM).

Figure 3:
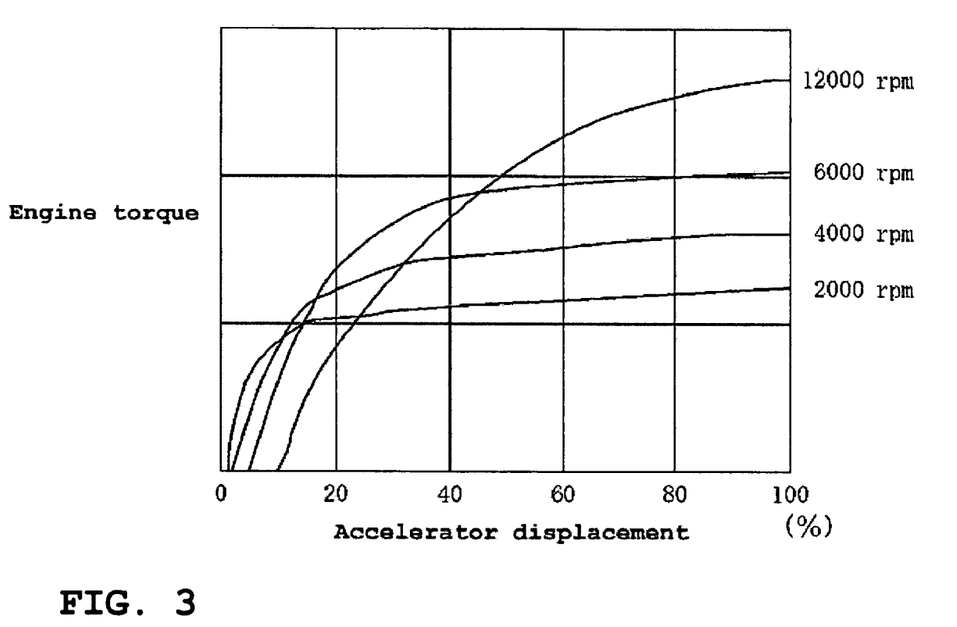
FIG. 3 is a graph showing engine torque relative to the accelerator displacement according to the present invention.
Figure 4:
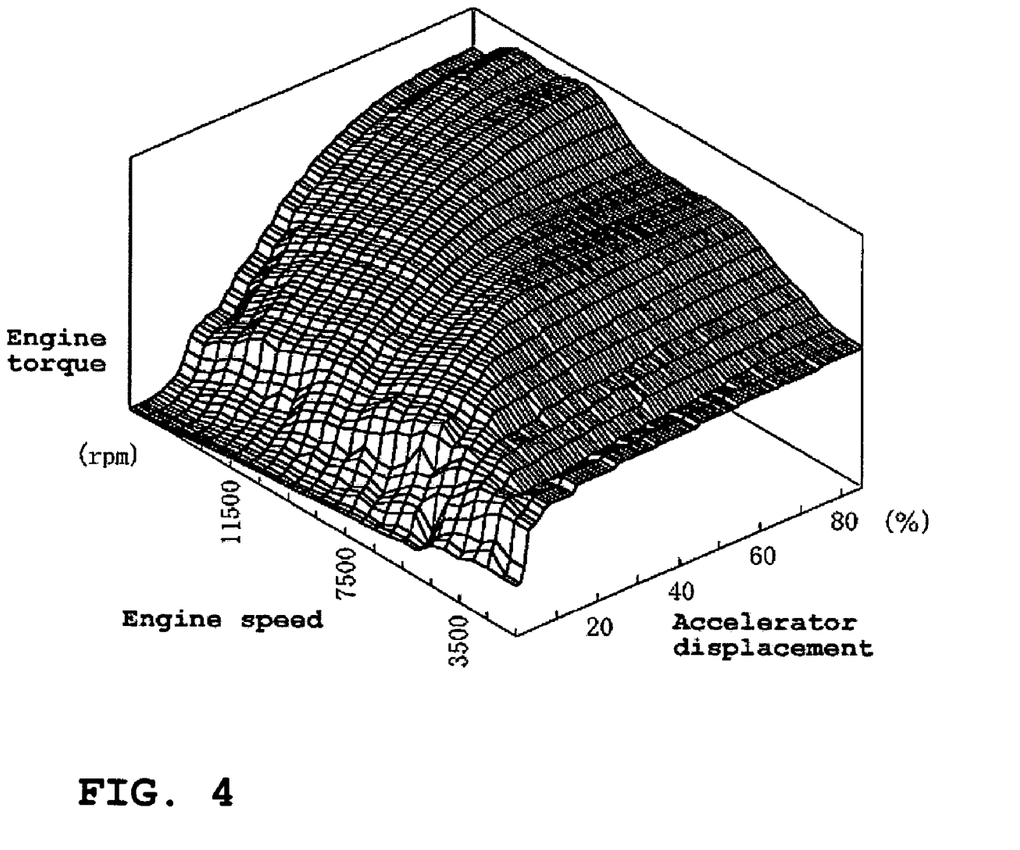
FIG. 4 is a three-dimensional map showing the engine torque relative to the accelerator displacement according to the present invention.

FIG. 3 is a plot of the engine torque that is obtained relative to the accelerator displacement for each engine speed based on the map data of FIGS. 2(a) and 2(b). FIG. 4 is a three-dimensional plot of FIG. 3. As seen in FIGS. 3 and 4, the rotation of a throttle valve is controlled such that the engine torque increases in response to an increase in the accelerator displacement for all engine speeds.

Figure 5:
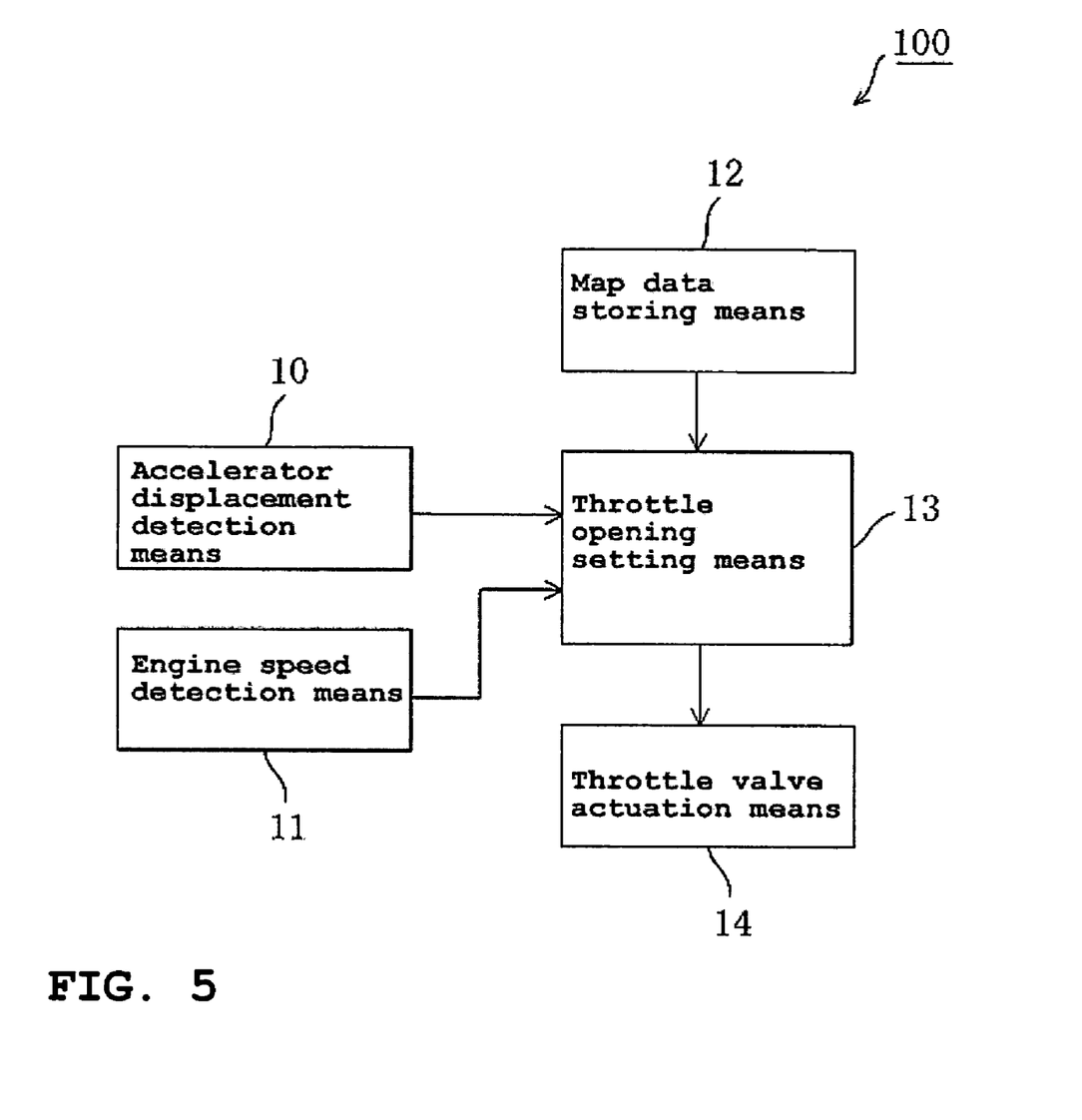
FIG. 5 is a block diagram illustrating the configuration of an engine output control device for a two-wheeled motor vehicle of the present invention.

FIG. 5 is a block diagram illustrating the basic configuration of an engine output control device for a two-wheeled motor vehicle of the present invention. Accelerator displacement detection means (accelerator position sensor) 10 detects the accelerator displacement. Engine speed detection means 11 detects the engine speed. Throttle opening setting means 13 sets the required throttle opening relative to the accelerator displacement detected by the accelerator displacement detection means 10 and the engine speed detected by the engine speed detection means 11, based on the throttle opening map data stored in map data storage means 12. Then, the throttle valve is rotatively driven with throttle valve actuation means 14 by the throttle opening that has been set, so that desired engine torque is obtained.

While the invention is explained above by way of the preferable embodiment, such descriptions are not limiting items. Therefore, various modifications may be made.

The term "two-wheeled motor vehicle" used herein means a motorcycle, including every motorbike and motor scooter, and, more particularly, is a vehicle which can be turned by tilting the vehicle body. Thus, a vehicle equipped with two or more front wheels and/or two or more rear wheels, thus having three or four (or more) wheels in total is also included in the "two-wheeled motor vehicle." Without any limitation to two-wheeled motor vehicles, the present invention may also be applied to other vehicles, as long as a vehicle can take advantage of effects of the invention. This includes any straddle type vehicles, such as four-wheeled buggies or all terrain vehicles (ATV) and snowmobiles.

The present invention provides the excellent advantages as described above. However, application of the present invention to the actual straddle type vehicle should be practiced based on consideration of the embodiment from an overall viewpoint including other requirements.

The present invention provides an engine control device responsive to a rider's accelerator operation.

The invention claimed is:

1. An engine control device for a straddle type vehicle with an electronically controlled throttle valve in which a throttle opening is controlled in response to the displacement of an accelerator,
    wherein the throttle opening is controlled such that engine torque increases in response to an increase in accelerator displacement for all engine speeds, and wherein at least when engine speed is in a low-speed range, the engine torque approximates a torque value (B) that is less than a maximum torque value (A) in a range in which the accelerator displacement is small, and thereafter the engine torque is controlled to gradually increase to the maximum torque value (A) in response to an increase in the accelerator displacement.

2. The engine control device for a straddle type vehicle according to claim 1, wherein the accelerator displacement and the throttle opening that is set correspondingly to the accelerator displacement are stored in storage means in advance as map data relative to each engine speed.

3. The engine control device for a straddle type vehicle according to claim 2, comprising:
    accelerator displacement detection means for detecting the accelerator displacement; and
    engine speed detection means for detecting the engine speed,
    wherein rotation of the electronically controlled throttle valve is controlled to the throttle opening that is determined based on the map data stored in the storage means relative to the accelerator displacement detected by the accelerator displacement detection means and the engine speed detected by the engine speed detection means.

4. A straddle type vehicle with the engine control device according to claim 3.

5. A straddle type vehicle with the engine control device according to claim 2.

6. A straddle type vehicle with the engine control device according to claim 1.

7. An engine control method for a straddle type vehicle in which engine torque is controlled by electronically controlling a throttle opening in response to displacement of an accelerator,
    wherein the throttle opening is controlled such that the engine torque increases in response to an increase in accelerator displacement for all engine speeds, and
    wherein the throttle opening is controlled such that at least when engine speed is in a low-speed range the engine torque approximates a torque value (B) that is less than a maximum torque value (A) in a range in which the accelerator displacement is small, and thereafter gradually increases to the maximum torque value (A) in response to an increase in the accelerator displacement.

8. The engine control, method for a straddle type vehicle according to claim 7, wherein the accelerator displacement and the throttle opening that is set correspondingly to the accelerator displacement are stored in advance as map data relative to each engine speed, and
    wherein the throttle opening is determined based on the stored map data relative to the detected accelerator displacement and engine speed.

* * * * *